(12) United States Patent
König et al.

(10) Patent No.: US 10,107,633 B2
(45) Date of Patent: Oct. 23, 2018

(54) METHODS AND SYSTEMS FOR PROVIDING INFORMATION INDICATIVE OF A RECOMMENDED NAVIGABLE STRETCH

(71) Applicant: TomTom Traffic B.V., Amsterdam (NL)

(72) Inventors: Felix Godafoss König, Berlin (DE); Nikolaus Witte, Berlin (DE); Oliver Kannenberg, Berlin (DE)

(73) Assignee: TOMTOM TRAFFIC B.V., Amsterdam (NL)

( * ) Notice: Subject to any disclaimer, the term of this patent is extended or adjusted under 35 U.S.C. 154(b) by 40 days.

(21) Appl. No.: 14/786,991

(22) PCT Filed: Apr. 23, 2014

(86) PCT No.: PCT/EP2014/058238
§ 371 (c)(1),
(2) Date: Oct. 26, 2015

(87) PCT Pub. No.: WO2014/173948
PCT Pub. Date: Oct. 30, 2014

(65) Prior Publication Data
US 2016/0076896 A1    Mar. 17, 2016

(30) Foreign Application Priority Data

Apr. 26, 2013 (GB) .................................. 1307550.2

(51) Int. Cl.
*G01C 21/34* (2006.01)
*G01C 21/26* (2006.01)
(Continued)

(52) U.S. Cl.
CPC ......... *G01C 21/3415* (2013.01); *G01C 21/26* (2013.01); *G01C 21/3492* (2013.01);
(Continued)

(58) Field of Classification Search
CPC ........................ G01C 21/3415; G01C 21/26; G01C 21/3492; G01C 21/36; G01C 21/3667;
(Continued)

(56) References Cited

U.S. PATENT DOCUMENTS 5,913,917 A    6/1999   Murphy
5,933,100 A    8/1999   Golding
(Continued)

FOREIGN PATENT DOCUMENTS

CN    1749696 A    3/2006
CN    1773566 A    5/2006
(Continued)

OTHER PUBLICATIONS

International Search Report of International Application No. PCT/EP2008/064317 dated Feb. 18, 2009.
(Continued)

*Primary Examiner* — Calvin Cheung

(57) ABSTRACT

A server 402 determines modified flow speed data for each navigable segment of a recommended navigable stretch. The modified flow speed data is determined so as to make the segment more favorable when a route is determined by a navigation device through the navigable network using the flow speed data. The server transmits the modified flow speed data to a set of one or more navigation devices 400 for use by the or each device at least for the purposes of determining a route through the network of navigable segments. Each navigation device then determines a route to a destination using the modified flow speed data.

16 Claims, 7 Drawing Sheets

(51) Int. Cl.
*G06F 17/30* (2006.01)
*H04W 4/04* (2009.01)
*G08G 1/01* (2006.01)
*G01C 21/36* (2006.01)

(52) U.S. Cl.
CPC ......... *G01C 21/36* (2013.01); *G01C 21/3667* (2013.01); *G06F 17/30241* (2013.01); *G08G 1/0133* (2013.01); *H04W 4/046* (2013.01)

(58) Field of Classification Search
CPC ............. G06F 17/30241; G08G 1/0133; H04W 4/046
See application file for complete search history.

(56) References Cited

U.S. PATENT DOCUMENTS

| | | | |
|---|---|---|---|
| 6,012,013 A | 1/2000 | McBurney | |
| 6,122,593 A | 9/2000 | Friederich et al. | |
| 6,178,374 B1 | 1/2001 | Mohlenkamp et al. | |
| 6,181,020 B1 | 1/2001 | Uchida et al. | |
| 6,188,943 B1 | 2/2001 | Uchida et al. | |
| 6,317,686 B1 | 11/2001 | Ran | |
| 6,401,027 B1 | 6/2002 | Xu et al. | |
| 6,567,744 B1 | 5/2003 | Katayama et al. | |
| 6,587,777 B1 | 7/2003 | St. Pierre | |
| 6,615,130 B2 | 9/2003 | Myr | |
| 6,621,452 B2 | 9/2003 | Knockeart et al. | |
| 6,707,421 B1 | 3/2004 | Drury et al. | |
| 6,812,888 B2 | 11/2004 | Drury et al. | |
| 6,950,743 B2 | 9/2005 | Kainuma et al. | |
| 6,990,401 B2 | 1/2006 | Neiss et al. | |
| 7,050,903 B1 | 5/2006 | Shutter et al. | |
| 7,079,946 B2 | 7/2006 | Hunzinger | |
| 7,181,344 B2 | 2/2007 | Lehmann et al. | |
| 7,188,026 B2 | 3/2007 | Tzamaloukas | |
| 7,266,443 B2 | 9/2007 | Hirose | |
| 7,289,039 B2 | 10/2007 | Kato | |
| 7,349,801 B2 | 3/2008 | Kim | |
| 7,355,528 B2 | 4/2008 | Yamane et al. | |
| 7,366,606 B2 | 4/2008 | Uyeki | |
| 7,375,649 B2 | 5/2008 | Gueziec | |
| 7,499,949 B2 | 3/2009 | Barton | |
| 7,516,041 B2 | 4/2009 | Smartt et al. | |
| 7,536,254 B2 | 5/2009 | Kumagai et al. | |
| 7,609,176 B2 | 10/2009 | Yamane | |
| 7,630,986 B1 | 12/2009 | Herz et al. | |
| 7,680,596 B2 | 3/2010 | Uyeki et al. | |
| 7,698,061 B2 | 4/2010 | Singh | |
| 7,706,964 B2 | 4/2010 | Horvitz et al. | |
| 7,739,041 B2 | 6/2010 | Chang | |
| 7,774,121 B2 | 8/2010 | Lee et al. | |
| 7,840,326 B1 | 11/2010 | Yamada | |
| 7,912,627 B2 | 3/2011 | Downs et al. | |
| 7,957,893 B2 | 6/2011 | Smartt | |
| 8,063,755 B2 | 11/2011 | Eikelenberg et al. | |
| 8,332,132 B2 | 12/2012 | Groenhuijzen et al. | |
| 8,358,224 B2 | 1/2013 | Seder et al. | |
| 8,395,529 B2 | 3/2013 | Seder et al. | |
| 8,428,335 B2 | 4/2013 | Ge et al. | |
| 8,626,437 B2 | 1/2014 | Yun | |
| 2001/0029425 A1 | 10/2001 | Myr | |
| 2004/0030670 A1 | 2/2004 | Barton | |
| 2004/0034467 A1 | 2/2004 | Sampedro et al. | |
| 2004/0039523 A1 | 2/2004 | Kainuma et al. | |
| 2004/0104842 A1 | 6/2004 | Drury et al. | |
| 2004/0193365 A1* | 9/2004 | Kokojima | G01C 21/20 701/533 |
| 2004/0230373 A1 | 11/2004 | Tzamaloukas | |
| 2005/0027434 A1 | 2/2005 | Hirose | |
| 2005/0093720 A1 | 5/2005 | Yamane et al. | |
| 2005/0206534 A1 | 9/2005 | Yamane et al. | |
| 2005/0222751 A1 | 10/2005 | Uyeki | |
| 2005/0222756 A1* | 10/2005 | Davis | G01C 21/3484 701/466 |
| 2005/0222764 A1 | 10/2005 | Uyeki et al. | |
| 2006/0064239 A1 | 3/2006 | Ishii | |
| 2006/0106531 A1 | 5/2006 | Nagase et al. | |
| 2006/0178807 A1 | 8/2006 | Kato et al. | |
| 2006/0206256 A1 | 9/2006 | Kumagai et al. | |
| 2007/0038362 A1 | 2/2007 | Gueziec | |
| 2007/0106465 A1* | 5/2007 | Adam | G01C 21/3492 701/533 |
| 2007/0208496 A1 | 9/2007 | Downs et al. | |
| 2007/0208501 A1 | 9/2007 | Downs et al. | |
| 2008/0004789 A1 | 1/2008 | Horvitz et al. | |
| 2008/0234921 A1 | 9/2008 | Groenhuijzen et al. | |
| 2008/0275629 A1 | 11/2008 | Yun | |
| 2009/0287405 A1 | 11/2009 | Liu et al. | |
| 2009/0306884 A1 | 12/2009 | Mueller | |
| 2010/0057346 A1 | 3/2010 | Ehrlacher | |
| 2010/0253541 A1 | 10/2010 | Seder et al. | |
| 2010/0253542 A1 | 10/2010 | Seder et al. | |
| 2011/0055210 A1 | 3/2011 | Meredith et al. | |
| 2011/0178698 A1* | 7/2011 | Aben | G01C 21/3476 701/532 |
| 2011/0264265 A1 | 10/2011 | Kanemoto | |
| 2011/0264365 A1* | 10/2011 | Singh | G01C 21/3484 701/532 |
| 2012/0046860 A1* | 2/2012 | Curtis | G06Q 30/0282 701/418 |
| 2012/0143886 A1* | 6/2012 | Okude | G01C 21/32 707/756 |
| 2012/0239607 A1* | 9/2012 | Rao | G06Q 30/02 706/58 |
| 2013/0013203 A1* | 1/2013 | Sumizawa | G01C 21/3658 701/533 |
| 2013/0150087 A1* | 6/2013 | Kosuru | G06Q 30/02 455/456.3 |
| 2013/0158845 A1* | 6/2013 | Davis | G01C 21/3492 701/117 |
| 2014/0012494 A1* | 1/2014 | Cudak | G01C 21/3415 701/412 |
| 2014/0046591 A1* | 2/2014 | Boldyrev | G01C 21/3438 701/533 |

FOREIGN PATENT DOCUMENTS

| | | |
|---|---|---|
| CN | 1879008 A | 12/2006 |
| CN | 1956566 A | 5/2007 |
| CN | 1963847 A | 5/2007 |
| DE | 10037827 A1 | 2/2002 |
| DE | 102006010572 A1 | 9/2007 |
| EP | 1005627 B1 | 10/2003 |
| EP | 1387145 A1 | 2/2004 |
| EP | 1503355 A1 | 2/2005 |
| EP | 1657692 A | 5/2006 |
| EP | 1840519 A1 | 10/2007 |
| EP | 2017640 A1 | 1/2009 |
| FR | 2900728 A1 | 11/2007 |
| GB | 2431261 A | 4/2007 |
| JP | H7129893 A | 5/1995 |
| JP | H10141975 | 5/1998 |
| JP | 2002117491 A | 4/2002 |
| JP | 2005017151 A | 1/2005 |
| JP | 2005038447 A | 2/2005 |
| JP | 2006184084 A | 7/2006 |
| JP | 2007106206 A | 4/2007 |
| JP | 2007248347 A | 9/2007 |
| JP | 2010210284 | 9/2009 |
| JP | 2009229294 | 10/2009 |
| JP | 2011502298 | 1/2011 |
| JP | 2011252767 | 12/2011 |
| RU | 2270480 C2 | 2/2006 |
| TW | 200712529 A | 4/2007 |
| TW | 200737058 A | 10/2007 |
| WO | 9909374 A1 | 2/1999 |
| WO | 0201532 A1 | 1/2002 |
| WO | 2007042796 A1 | 4/2007 |

OTHER PUBLICATIONS

International Search Report of International Application No. PCT/EP2008/064318 dated Feb. 4, 2009.

(56) References Cited

OTHER PUBLICATIONS

International Search Report of International Application No. PCT/EP2008/064319 dated Feb. 11, 2009.
International Search Report of International Application No. PCT/EP2008/064320 dated Mar. 23, 2009.
International Search Report of International Application No. PCT/EP2008/064322 dated Feb. 4, 2009.
International Search Report of International Application No. PCT/EP2008/064323 dated Mar. 23, 2009.
Bekir, Bartin, A Clustering Based Methodology for Determining the Optical Roadway Configuration of Detectors for Travel Time Estimation, Transportation Research Board 2007 Annual Meeting, Submitted to the 86th Transportation Research Board Annual Meeting, Aug. 1, 2006, found online at www.rits.rutgers.edu/files/clusteringpaper.pdf, see pp. 1-13.
Standard Deviation Definition, 2pages, May 8, 2005 available online @ http://web.archive.org/web/20050208112010/http://www.chemicool.com/definition/standard_deviation.html, last accessed Jun. 5, 2012.
A Tutorial on Clustering Algorithms, 3pages, dated Aug. 11, 2007 via wayback machine, available online @ http://web.archive.org/web/20070811043338/http://home.dei.polimi.it/matteucc/Clustering/tutorial_html/, last accessed Jun. 5, 2012.
International Search Report of International Application No. PCT/EP2014/058238 dated Jun. 25, 2014.

* cited by examiner

METHODS AND SYSTEMS FOR PROVIDING INFORMATION INDICATIVE OF A RECOMMENDED NAVIGABLE STRETCH

The present application is the National Stage of International Application No. PCT/EP2014/058238, filed Apr. 23, 2014 and designating the United States, which claims benefit to United Kingdom Patent Application 1307550.2 filed on Apr. 26, 2013. The entire content of these applications is incorporated herein by reference.

FIELD OF THE INVENTION

This invention relates to methods and systems for providing information indicative of a recommended navigable stretch to one or more navigation devices of a system using a server, and also extends to navigation devices and servers arranged to perform their respective steps in such methods and systems. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to execute navigation software so as to provide navigation functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route. Route planning and navigation functionality may also be provided by a desktop or mobile computing resource running appropriate software.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

A route for use by a navigation device may be determined, e.g. by a routing engine using attributes associated with navigable segments of a network of navigable segments in a region covered by a digital map. The attributes may be used in determining cost information for use in a cost function to determine a route through the navigable network corresponding to a least cost path based upon one or more of the attributes. Examples of attributes that may be associated with navigable segments and used in determining a routing through the navigable network in this way include a speed profile for the segment, e.g. an average speed of travel along the segment, which may be in respect of a given time period, a traversal time for the segment, a fuel requirement for traversing the segment, etc. The determination of a route may be carried out "on-board" by a navigation device, or "off-board" by a server (with the determined route then being transmitted to the navigation device), or may be carried out using a combination of both "off-board" and "on-board" route determination (in a so-called "hybrid" process).

In systems in which routing is to take into account real-time traffic conditions on the network, a server may be arranged to provide new attribute data to a navigation device for association with certain navigable segments of the navigable network. For example, modified speed profile data for association with certain navigable segments may be transmitted to a device for use by the device in route determination where it is found by the server that the actual speed profile associated with those navigable segments differs from the expected, e.g. historical, average speed for the relevant time period by a significant amount. The actual speed profile data may be determined based upon "current" positional data from devices traversing the segment and/or other sources, e.g. traffic message provider services, etc. In this way, a routing engine that takes speed profile data for navigable segments into account when determining a least cost route may operate upon currently valid speed data, to provide route recommendations that are appropriate under current traffic conditions. One example of a system of this type is described in the Applicant's WO 2009/053406 A1; the entire content of which is incorporated herein by reference. Of course, in "off-board" or "hybrid" systems, the modified speed profile data may alternatively or additionally be used by a server to change the speed profile associated with certain navigable segments, and to then determine a route based upon the data for transmission to a navigation device.

Sometimes it is desirable to be able to communicate a route recommendation to a navigation device, e.g. a recommended route to avoid traffic affected roads, etc. Current methods for providing route recommendations involve transmitting such a recommendation as a defined route that it is to be followed by the navigation device. This may lead to a vehicle with which the device is associated having to perform abrupt manoeuvres to adhere to a received route recommendation. The Applicant has realised that there is a need for improved and more flexible techniques for providing information regarding a recommended navigable stretch to a navigation device.

SUMMARY OF THE INVENTION

In accordance with a first aspect of the invention there is provided a method of operating a server to provide information indicative of a recommended navigable stretch to a set of one or more navigation devices of a plurality of navigation devices in communication with the server, wherein the server has access to digital map data comprising data representative of a plurality of navigable segments of a navigable network, each navigable segment having attribute data representative of one or more attributes associated therewith, the method comprising:

determining modified attribute data for the or each navigable segment of a recommended navigable stretch, wherein the modified attribute data is determined so as to make the segment more favourable when a route is determined through the navigable network using the attribute data associated with the navigable segments; and transmitting data indicative of the determined modified attribute data for the or each navigable segment of the recommended navigable stretch to the set of one or more of the navigation devices for use by the or each device in determining a route through the navigable network.

In accordance with a further aspect of the invention there is provided a server arranged to provide information indicative of a recommended navigable stretch to a set of one or more navigation devices of a plurality of navigation devices in communication with the server, the server having access to digital map data comprising data representative of a plurality of navigable segments of a navigable network, each navigable segment having attribute data representative of one or more attributes associated therewith, the server comprising:

means for determining modified attribute data for the or each navigable segment of a recommended navigable stretch, wherein the modified attribute data is determined so as to make the segment more favourable when a route is determined through the navigable network using the attribute data associated with the navigable segments; and means for transmitting data indicative of the determined modified attribute data for the or each navigable segment of the recommended navigable stretch to the set of one or more of the navigation devices for use by the or each device in determining a route through the navigable network.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa. The present invention is a computer implemented invention, and any of the steps described in relation to any of the aspects or embodiments of the invention may be carried out under the control of a set of one or more processors. The means for carrying out any of the steps described in relation to the system may be a set of one or more processors.

The present invention extends to a navigation device for use in the method of the present invention in any of its embodiments, and to a method of operating a navigation device in accordance with the method of the invention in any of its embodiments.

Thus, in accordance with a further aspect of the invention there is provided a method of operating a navigation device in communication with a server, the navigation device comprising digital map data including data representative of a plurality of navigable segments of a navigable network, each navigable segment having attribute data representative of one or more attributes associated therewith, and the navigation device being further arranged to be able to determine a route through the navigable network using the attribute data associated with the navigable segments, the method comprising:

receiving, from the server, data indicative of modified attribute data for the or each navigable segment of a recommended navigable stretch, wherein the modified attribute data is determined so as to make the segment more favourable when a route is determined through the navigable network using the attribute data associated with the navigable segments; and using the received modified attribute data in determining a route through the navigable network.

In accordance with a further aspect of the invention there is provided a navigation device comprising data storage means for storing digital map data including data representative of a plurality of navigable segments of a navigable network, each navigable segment having attribute data representative of one or more attributes associated therewith, the navigation device being capable of communicating with a server and being arranged to be able to determine a route through the navigable network using the attribute data associated with the navigable segments, the navigation device comprising:

means for receiving, from the server, data indicative of modified attribute data for the or each navigable segment of a recommended navigable stretch, wherein the modified attribute data is determined so as to make the segment more favourable when a route is determined through the navigable network using the attribute data associated with the navigable segments; and means for using the received modified attribute data in determining a route through the navigable network.

The present invention in accordance with any of the further aspects of the invention may include any of the features or steps described in relation to any other one of the aspects of the invention to the extent that they are not mutually exclusive therewith.

The present invention further extends to a system comprising a plurality of navigation devices and a server in communication with each of the plurality of navigation for use in the method of the present invention in any of its embodiments, and to a method of providing information indicative of a recommended navigable stretch to a set of one or more navigation devices in such a system.

Thus, in accordance with the invention, a server determines modified attribute data in respect of at least one attribute associated with each of one or more navigable segments of a digital map that form a recommended navigable stretch that it is desired to communicate to a set of one or more navigation devices. The attribute data is modified in such a manner that the segment to which the modified attribute data relates will be treated more favourably when a route is determined through the navigable network to a destination by reference to the attribute data associated with the segments of the network. The modified attribute data is transmitted to one or more navigation devices at least for use in determining a route through the network of navigable segments represented by digital map data of the or each device by reference to the attribute data associated with the segments. In embodiments, the modified attribute data will result in the segment being determined to have a lower cost by a routing engine, such that it will be treated more favourably when a "least cost" path is determined. In other words, by modifying the attribute data of the navigable segment(s) of a navigable stretch to be recommended so as to decrease the cost associated with navigable segment(s), the present invention may result in the recommended stretch being favoured when a navigation device determines a route to a destination using the attribute data associated with navigable segments of the network. Thus, a recommended navigable stretch is communicated by the server by modifying attribute data for the segment(s) thereof in a manner which makes them more favourable to a route generation engine. The stretch is "recommended" by making those segments that form part of the stretch more favourable when considered in a process of determining a route through the navigable network to a destination. The present invention therefore provides a way of indirectly communicating a recommended navigable stretch to one or more navigation devices. It has been found that in contrast to transmitting the recommended route directly, i.e. as a route to be followed, by transmitting modified attribute data in respect of the segment(s) of the route that will result in the segment(s) being favoured when the navigation device determines a route through the navigable network, routes determined by the device may be gradually "pulled" toward the desired recommended route, without necessitating abrupt changes in route, e.g. U-turns, etc, which might be required if the device were instead instructed to simply follow a recommended route. This is because the recommended route is indicated merely by adjusting the attribute data used by the device in its route determination, resulting in the modification of only a part of the overall route determination process. For example, a device would not calculate a route involving a U-turn or similar to reach the recommended route, but could calculate a route that will gradually bring the device towards the recommended route so as to join the route at a later point.

The term "navigable stretch" as used herein is refers to at least a portion of one or more navigable segments. The stretch may be made up of a part of one or more navigable segments and/or may include one or more entire navigable segments. In accordance with the invention, the server determines modified attribute data in relation to the or each navigable segment, at least a portion of which forms part of the recommended navigable stretch.

The attribute or attributes associated with the or each segment of the recommended navigable stretch for which modified attribute data is determined by the server in accordance with the invention may be any one of the attributes associated with the or each segment which, when modified in accordance with the invention, will result in the or each segment becoming more favourably treated when considered in relation to determining a route through the navigable network comprising the segment(s) to a destination. In some preferred embodiments only one attribute associated with a segment is modified, although it is envisaged that any combination of attributes may be modified provided that this results in the segment being considered to be more favourable when a route is determined.

In embodiments the attribute data is modified such that the or each segment will be associated with a reduced cost, e.g. by a routing engine, when determining a route to a destination through the network of navigable segments based on a cost associated with the traversal each navigable segment. In these embodiments the attribute(s) is an attribute(s) used in determining the cost of traversing a segment for the purposes of route determination. The route determination may involve determining a route through the network of navigable segments based on a determined cost of traversing each segment using a cost function. The route determination may involve determining a route that corresponds to a least cost path through the navigable network.

In accordance with the invention, the attribute data is modified such that the or each navigable segment of the recommended navigable stretch will be more favourably treated when a route through the navigable network represented by the digital map data of a navigation device, and including the recommended navigable stretch, is determined by a navigation device with reference to the attribute data associated with the segments of the navigable network. In embodiments each navigation device comprises a routing engine arranged to determine a route through the navigable network to which the digital map data of the navigation device relates to a destination based on a cost of traversing the segment associated with each of a plurality of the navigable segments thereof; the cost of traversing a given navigable segment for the purposes of route determination being determined by reference to one or more attributes of the segment. The routing engine of the navigation device may or may not take into account each navigable segment of the navigable network. For example, the navigation device may consider only certain navigable segments, e.g. forming part of a routing corridor, etc. The routing engine may be arranged to determine the route based on the cost associated with each segment using a cost function. The routing engine may be arranged to determine a route through the navigable network corresponding to a least cost path through the navigable network. In these embodiments the one or more attributes of the segment or segments for which the server determines modified attribute data correspond to the or each attribute that is used by the routing engine in determining the cost of a given navigable segment. The method may comprise the server determining the or each navigation device to which the modified attribute data is to be transmitted, i.e. to which a navigable stretch is to be communicated, and preferably selecting the attribute to be modified based upon the attribute or attributes used by a routing engine of the or each device.

The modification of the attribute or attributes of a segment results in the segment becoming relatively more favourable in a routing process, i.e. more favoured for inclusion in a route, than prior to the modification of the attribute or attributes. In embodiments the routing process is a routing process that is performed by the or each navigation device to which the modified attribute data is to be transmitted. The modification results in the segment becoming associated with a reduced cost for traversing the segment relative to the cost prior to modification of the attribute or attributes. The cost is determined by reference to the or each attribute that is modified. In some embodiments the modification of the attribute or attributes of the or each navigable segment along the recommended navigable stretch may result in the or each navigable segment being favoured relative to other navigable segments of the navigable network that do not form part of the navigable stretch. The or each segment may be associated with a reduced traversal cost relative to other segments which do not form part of the recommended navigable stretch in route determination. The navigable segment(s) of the recommended navigable stretch may become more favourable than any other navigable segment of the navigable network that does not form a part of the recommended navigable stretch.

The attribute or attributes which are modified will therefore depend upon those attribute(s) which are considered for the purposes of routing, e.g. by a routing engine of a navigation device, such as in determining a least cost route across the network of navigable segments.

Each navigation device of the system has access to digital map data. Preferably the device stores the digital map data. The digital map data is stored locally by the device. Thus each navigation device may store the digital map data in a memory thereof. The digital map data of a navigation device may be referred to as "local digital map data".

The server also has access to digital map data. Preferably the server stores the digital map data. Thus the digital map data is stored locally by the server, e.g. in a memory thereof. The digital map data of the server may be referred to as "central digital map data".

The digital map data of both the server and each navigation device is representative at least of a given network of navigable segments including the navigable segment(s) of the recommended navigable stretch. It will be appreciated that the digital map data of the server and the navigation devices may differ. For example, the network of navigable segments in relation to which a navigation device comprises digital map data may be a subset of a network of navigable segments in relation to which the server comprises digital map data.

In some preferred embodiments the at least one attribute associated with the or each navigable segment of a recommended navigable stretch in relation to which the server determines modified attribute data includes a flow speed associated with the segment, or in other words an expected speed travel along the segment. Although other modified attribute data may alternatively or additionally be determined in respect of one or more other attributes of a navigable segment, flow speed has been found to be a particularly effective attribute to be modified to result in the recommended navigable stretch being treated more favourably in route determination. This is because routing engines typically take into account at least flow speed associated with segments of a navigable network when determining a route therethrough. The flow speed may be used in determining a cost associated with a segment for use in a least cost path determination, e.g. to determine a fastest route. A higher flow speed associated with a segment is preferably associated with a lower cost in the route determination, e.g. implemented by a routing engine.

Furthermore, the invention in these embodiments may be more readily implemented using existing infrastructure for transmitting traffic information to navigation devices. For example, as described in WO 2009/053406 A1 discussed above (the entire content of which is incorporated herein by reference), a traffic server may be provided for transmitting modified flow speed data in respect of a navigable segment to devices where a traffic event has caused the actual flow speed on the segment to decrease by a significant amount relative to an expected flow speed for the segment, e.g. according to historical average speed data. Modified flow speed data may similarly be determined and transmitted in respect of a segment or segments of a recommended navigable stretch in accordance with the invention, but in this context, modified to arbitrarily increase the flow speed associated with the segment relative to the flow speed indicated by the existing flow speed data in order to cause the segment to be more favourably treated in route determination.

In preferred embodiments in which the server determines modified flow speed data for the or each navigable segment of the recommended stretch, the modified flow speed data determined is selected to arbitrarily increase the flow speed associated with the segment relative to the flow speed indicated by the existing flow speed data for the segment to cause the segment to be more favourably treated in routing determination. The modified flow speed data is indicative of a given higher flow speed than the unmodified flow speed data associated with the segment. The given higher flow speed may be any arbitrarily chosen high flow speed, such as 200 km/hr. The flow speed may be taken to be higher than any actual (e.g. legal or permitted) flow speed along a navigable segment.

The existing flow speed associated with a segment that is modified in these embodiments of the invention is indicative of an expected speed of travel across the segment. The flow speed may be indicative of an average speed of travel across the segment.

Preferably the existing flow speed data is based at least in part on positional data relating to the movement of devices having positional capability with respect to time along the segments, and which may be used to provide a positional "trace" of the path taken by the device. The devices may be any mobile devices that are capable of providing the positional data, associated timing data, and in many cases associated speed data. The device may be any device having position determining capability. Typically the device may comprise a GPS or GSM device. Such devices may include navigation devices, mobile telecommunications devices with positioning capability, position sensors, etc. The device may be associated with a vehicle. In these embodiments the position of the device will correspond to the position of the vehicle. The vehicle may then be a powered or non powered vehicle, such as an automobile, train, boat, bicycle, etc. The device may be integrated with the vehicle, e.g. as an in-built sensor or navigation device, or may be a separate device associated with the vehicle such as a portable navigation device. Of course, the positional data may be obtained from a combination of different devices, or a single type of device.

In one method a plurality of time-stamped position data is preferably captured/uploaded from a plurality of devices having positioning capability, e.g. navigation devices, such as portable navigation devices (PNDs). Techniques of analysing such data, e.g. to obtain average speed data, are described, for example, in WO 2009/053411 A1 (the entire content of which is incorporated herein by reference). Thus, a plurality of time-stamped position data may be obtained, e.g. captured/uploaded, from a plurality of devices having positioning capability, such as portable navigation devices (PNDs). This data is preferably divided into a plurality of traces, with each trace representing data received from a device over a predetermined time period. An average may then be taken of the recorded speeds within each predetermined time period for each navigable segment.

It will be appreciated that the positional data obtained from the plurality of devices may be referred to as "probe data". The data obtained from devices associated with vehicles may be referred to as "vehicle probe data". References to probe data herein should therefore be understood as being interchangeable with the term "positional data", and the positional data may be referred to as probe data for brevity herein.

The existing flow speed data for a segment that is modified in accordance with the invention may be based upon historical speed data and/or live speed data. Live data may be thought of as data which is relatively current and provides an indication of relatively current speeds of travel along the segment. The live data may typically relate to the conditions on the path controlled by the traffic control signal within the last 30 minutes, 15 minutes, 10 minutes or 5 minutes. In the context of the present invention, the word "historical" should be considered to indicate data that is not live, that is data that is not directly reflective of conditions on the segment at the present time or in the recent past (perhaps within roughly the last five, ten, fifteen or thirty minutes). Historical positional data can also be referred to as aggregated positional data, since it will typically comprise positional data from a plurality of different mobile devices collected over an extended period of time, such as a number of weeks or months. Historical positional data is therefore useful in analysing the repeating patterns in the behaviour of vehicles on portions of the road network over long time periods (such as the average speed of travel along a road at various different times of the day); live positional data meanwhile is useful in detecting more transient behaviour of vehicles (such as identifying the occurrence of a traffic jam, or similar event effecting traffic flow, on a road).

The flow speed data associated with a segment that is modified in accordance with embodiments of the invention may be in respect of a given time period. For example, a given navigable segment of the digital map may be associated with a plurality of flow speeds in respect of different time periods. In some embodiments each navigable segment is associated with a set of flow speeds in respect of a plurality of time periods for each day of the week, e.g. at 5 minute intervals. The set of flow speeds for a navigable segment can be referred to as a speed profile for that segment. One or more of the speed profiles, or particular speed values within one or more speed values, may then be modified by the server. In embodiments flow speed data at least for a current time period is modified.

It will be appreciated that the phrase "average speed" is used herein. It will be appreciated however that in reality it may never be possible to know an average speed completely accurately. In some cases for example, average speeds calculated can only be as accurate as the equipment used to measure time and position. It will be appreciated therefore that wherever the phrase "average speed" is used, it should be interpreted as the average speed as calculated based on measurements which may themselves have associated errors.

In embodiments the server that is used in accordance with the invention may be a "traffic server". The modified attribute data may be transmitted to the or each navigation device in a similar manner to a "traffic message".

In embodiments the server may additionally be arranged to transmit information relating to traffic conditions on the navigable segments of the navigable network to the or each of the set of one or more navigation devices for use in route determination. In preferred embodiments in which flow speed data is associated with a plurality of the navigable segments of the digital map, the server is arranged to determine and transmit modified flow speed data to the or each navigation device in respect of one or more navigable segments along which an actual flow speed is determined to be lower than an expected flow speed along the segment as indicated by the existing flow speed data for the segment. The expected flow speed along the segment may be indicated by existing flow speed data that is indicative of a historic average flow speed for the segment, preferably in respect of the relevant time period. The modified flow speed data may be transmitted for those segment(s) along which the actual flow speed differs by a statistically significant amount from the expected flow speed. The segment or segments having the lower than expected flow speed may be segments along which flow is affected by a jam or another event affecting traffic flow. The modified flow speed data may be indicative of the actual flow speed determined for the or each segment, e.g. for a current time period.

It will be appreciated that in embodiments in which actual flow speed data is determined and/or provided to a navigation device, e.g. for modifying existing flow speed data for a segment affected by travel, the actual flow speed data may be determined from one or more sources including positional data relating to the movement of devices with respect to time along a segment, traffic reports or fixed sensors.

While in preferred embodiments the attribute that is modified in respect of the segments of the recommended stretch is a flow speed, there are numerous other attributes that can, alternatively, or additionally, be modified, to result in the segment being more favourably treated in route determination. Examples include traversal time for the segment, segment length, carbon emission quantity for traversing the segment, scenicity, change in elevation, curvature, or fuel consumption for traversing the segment. Any of these attributes may be used in determining a cost associated with the segment for use in determining a route by reference to the cost, e.g. a least cost path, depending upon the settings of the routing engine. For example, a user may be able to specify that they wish routes to be determined that minimise one or more of travel time, length, carbon emission level, or fuel consumption, or which maximise scenicity, or which minimise change in elevation or curvature, in addition to, or alternatively to, estimated time of arrival. It will be appreciated that the terms "maximised" and "minimized" refer to the routing being maximised or minimised by reference to the relevant attribute or attributes subject to any other constraints, e.g. other attributes that are to be considered. A routing engine may be arranged to balance a range of different attributes, e.g. using a cost function, when determining a route, which may or may not include user specified attributes.

In accordance with the invention, the server transmits data indicative of the determined modified attribute data to the or each navigation device of the set of one or more navigation devices. The data may be the modified attribute data or data otherwise indicative thereof, which may be used by a navigation device at least for the purposes of route determination taking into account the modified attribute data of segments. In other words, the modified attribute data enables such route determination to be based upon the modified attribute data rather than the existing corresponding attribute or attributes associated with the corresponding navigable segment or segments. Thus, the server may transmit data indicative of absolute values of modified attributes or indicative of the modification of the attributes relative to the values of existing attributes. Unless otherwise stated, references herein to the "modified attribute data" received from the server, or transmitted by the server, should be understood to refer to data indicative of the modified attribute data. It will be appreciated that the modified attribute data may be used by a device instead of, or in addition to, the existing corresponding attribute data in determining a route to a destination, or may be used by the device to modify existing attribute data for use in the route determination. Where other attribute data is associated with segments, and is not modified, this data may still additionally be used in route determination.

The method may comprise the step of a navigation device using the received data to modify the existing corresponding attribute data associated with the or each corresponding navigable segment of the digital map of the device to which the data relates at least for the purposes of determining a route through the network of navigable segments using the attribute data associated with the navigable segments represented by the digital map data of the device. The existing attribute data is modified to render the or each navigable segment more favourable when a route is determined through the navigable network represented by the digital map data of the device using attribute data including the modified attribute data associated with navigable segments thereof. Such a step may comprise the navigation device replacing the existing corresponding attribute data for the or each navigable segment for which the modified attribute data is provided with the received modified attribute data, or using the received modified attribute data to adjust the existing attribute data associated with the or each navigable segment for which the data is provided. Alternatively the navigation device may store the received modified attribute data in addition to the existing corresponding attribute data for use at least in determining a route. It is envisaged that the modified attribute data may be maintained in addition to the existing attribute data and/or may be only temporarily retained, such that the existing attribute data may be used for other purposes, or subsequently when the recommended route is no longer of relevance.

The method preferably extends to the step of the or each navigation device of the set of one or more navigation devices to which the data indicative of the modified attribute data is transmitted using the received data indicative of modified attribute data in determining a route through the navigable network to a destination, and the navigation devices of the system preferably comprise means for so doing. As discussed below, the route that is determined to a destination may be an initial route to the destination, or may be a re-calculation of a previously calculated route to the destination taking into account the modified attribute data received from the server. The step of determining a route through the navigable network may comprise determining a least cost route through the navigable network by reference to at least the attribute which is modified for those navigable segments forming part of the recommended stretch. The method may comprise the device using the attribute in a cost function for providing a least cost route. The determined route may comprise one or more of the segments of the navigable stretch. It will be appreciated that the determined route may not include the complete recommended stretch, depending upon the relative position of a device and the segment(s) of the stretch, as the present invention may result in a determined route converging more gradually upon the recommended stretch, without necessitating abrupt changes to correspond thereto.

The modified attribute data that is transmitted to a navigation device is preferably determined by the server, e.g. by selecting one or more predetermined values, in order to have the effect of causing the or each segment of the recommended stretch to be favoured in route determination by the device. Thus, the modified data will no longer reflect the real attribute of the segment. Although a navigation device uses the modified attribute data at least in determining a route to a destination in accordance with the invention, the existing attribute data may be retained and used in other contexts, which rely upon the "real" attribute.

The method may comprise a navigation device using the received data indicative of a modified attribute or attributes for a segment or segments corresponding to the recommended navigable stretch in determining a route to a destination through the network of navigable segments represented by the digital map data of the device, and using the existing unmodified data in respect of the corresponding attribute for the segment or segments in determining a property of a determined route including one or more segment of the recommended navigable stretch based on the attribute.

In preferred embodiments in which the attribute that is modified is a flow speed for the or each segment, the method may comprise a navigation device using the received data indicative of a modified flow speed for a segment or segments of the recommended navigable stretch in determining a route to a destination through the network of navigable segments represented by the digital map data of the device, and using the existing flow speed data for the segment or segments in determining an estimated time of arrival for a determined route including one or more segments of the navigable stretch. Similarly, if the attribute that is modified is of a different type, e.g. relating to length of the or each segment of the recommended stretch, or a fuel consumption for the or each segment, the corresponding unmodified attribute data for the or each segment may be used in determining a property of a determined route comprising one or more segment of the recommended navigable stretch based on the attribute, e.g. a length of the route, a fuel consumption for the route, etc.

In accordance with the invention in any of its aspects or embodiments, the server transmits data indicative of the determined modified attribute data to a set of one or more navigation devices. The set of one or more navigation devices is preferably a subset of the plurality of navigation devices of the system. The method may comprise the step of the sever selecting the set of one or more navigation devices to which to transmit the modified attribute data based on one or more criteria. In some preferred embodiments, a position of each of the plurality of navigation devices is known to the server, and the server selects the set of one or more navigation devices to which to transmit the modified attribute data based at least in part upon the current position of the or each navigation device. The position of each device may be known to the server by any means known in the art. It will be appreciated that each navigation device preferably has positioning capability. In embodiments, each navigation device is arranged to periodically transmit a current position of the device to the server. The modified attribute data may be transmitted to those navigation devices to which the recommended navigable stretch is expected to be relevant based upon the current position of the device(s). For example the set of one or more navigation devices may be devices for which a segment of the recommended navigable stretch is within a predetermined region based on the current position of the device. Alternatively or additionally the server may select the set of one or more navigation devices based at least in part upon a level of importance associated with following the recommended navigable stretch. The level of importance may be based upon the consequences of not following the route e.g. a severity of an incident affecting traffic flow along one or more other segment that the recommended route has been determined to avoid etc.

The methods of the present invention may be used in a variety of applications where it is desired for the server to be able to provide information regarding a recommended navigable stretch to one or more navigation devices. The recommended navigable stretch may be selected as appropriate given the particular context of use.

The method may comprise the server determining the recommended navigable stretch. In other embodiments the method may comprise the server receiving data indicative of the recommended navigable stretch. The data may be received from another server, e.g. a traffic server, a traffic control centre, a user, a navigation device, or any other suitable source. Data indicative of a navigable stretch may be transmitted to the server in real time. For example, where the recommended navigable stretch corresponds to a path being followed by a vehicle, data indicative of the navigable stretch may be continually transmitted to the server while the vehicle travels along the path. This may allow so-called "convoy driving" to be implemented as discussed below.

In some embodiments the recommended navigable stretch is a stretch that provides an alternative route around one or more navigable segments that are to be avoided. The one or more navigable segments to be avoided may be one or more navigable segments away from which it is desired to divert traffic for any reason. In some embodiments the one or more navigable segments are segments along which traffic flow is affected by congestion or an event. The event affecting traffic flow may be of any type that may affect traffic flow along at least a portion of one or more navigable segments. The event may be roadworks, a lane closure, or a road closure. However, other exemplary events may include a bottleneck (arising for any reason), or a lane restriction. An event may be a transient event, such as a rush hour, breakdown, accident, etc which affects traffic flow over the shorter term. Other events which may affect traffic flow over a longer term include roadworks, lane closures, road closures, etc, which may last for at least a day or so. In other embodiments the one or more navigable segments may be one or more navigable segments from which it is desired to divert traffic away in order to balance traffic load across the network of navigable segments, e.g. the road network. The one or more navigable segments to be avoided may be one or more navigable segments having an actual flow speed that is determined to be lower than an expected flow speed according to flow speed data associated with the segments. The server may additionally transmit data indicative of the actual flow speed for each of the segments as discussed above.

In these embodiments the one or more navigable segments of the recommended navigable stretch may be determined by the server, or data indicative of the recommended navigable stretch may be received by the server from another source. For example, where the server is a traffic server, the server may itself determine a recommended navigable stretch that will provide an alternative route around one or more navigable segments that are to be avoided for some reason. In embodiments in which the one or more navigable segments of the recommended stretch are determined by the server, the server may receive or determine data indicative of one or more navigable segments to be avoided, and determine the navigable stretch as providing an alternative route around the or each navigable segment to be avoided. In other embodiments, the server may receive data indicative of the recommended navigable stretch from another server, or from a traffic management centre (or a user therein), etc. In embodiments the server receives data indicative of the recommended stretch from a traffic control centre and/or determines the recommended navigable stretch using data indicative of one or more navigable segments to be avoided received from a traffic management (or control) centre.

In other embodiments the server may receive data indicative of the recommended navigable stretch from a user. The recommended navigable stretch may be a stretch that a user wishes to share with other users. The stretch may be, for example, a stretch that the user considers particularly scenic, or fun to drive. An indication of the recommended navigable stretch may be provided to the server by a user via the internet. For example, this may be achieved via a social media website, or via a navigation system providers website. In other embodiments a user may use their navigation device to record a route they have travelled, and transmit this recorded route to the server as a recommended navigable stretch. In these embodiments the method may comprise the server providing data indicative of the modified attribute data for the or each navigable segment of the recommended navigable stretch to a set of one or more navigation devices that are members of a predefined group of navigation devices for receiving information indicative of recommended navigable stretches suggested by other users. The devices may be devices of users that have opted to receive such recommendations from any other users or from specified other users. The server may comprise data indicative of the identities of devices associated with users that have opted to receive such recommendations.

Another application of the present invention is in the context of so-called hybrid navigation. As discussed earlier, in a hybrid navigation system, route determination is carried out by both a navigation device and a server. A navigation device may initially determine a route to a destination, and submit a request to a server for the server to independently determine a route to the destination. The server may then determine the route to the destination and transmit data indicative of the route to the navigation device. The data may be data indicative of the complete route, or indicative of the route by comparison to the route determined by the navigation device. In the latter embodiments the method may comprise the navigation device transmitting data indicative of the route to the destination as determined by the device to the server. The navigation device may then use route data received from the server in recalculating at least a remainder of a route to the destination. The route determined by the server may be received by the navigation device after navigation along the route to the destination determined by the device has commenced. Hybrid routing systems enable a balance to be achieved between quickly determining a route that can be followed initially i.e. as determined by the navigation device, and obtaining input from the server into the route determination process, which may have access to more up to date traffic information.

It has been found that the present invention provides a way for a server to transmit information indicative of a determined route to a navigation device in such systems. In some preferred embodiments the recommended navigable stretch is at least a portion of a route to a destination determined by the server in response to a request by a navigation device, and the modified attribute data is transmitted by the server to the device that requested the server to determine the route. Preferably the method comprises the navigation device independently calculating the route to the destination, and the method comprises the server transmitting the data indicative of the modified attribute data to the navigation device for use by the navigation device in recalculating at least a remainder of the route to the destination independently determined by the navigation device. The method may comprise the navigation device providing data indicative of the route to the destination as determined by the navigation device to the server. The method may comprise a navigation device determining a route to a destination, submitting a request to the server for the server to independently determine a route to the destination, the server determining the route to the destination and using at least a portion of the determined route as the recommended navigable stretch in accordance with any of the embodiments of the invention. The method may comprise the server transmitting the modified attribute data in respect of the or each navigable segment of the navigable stretch to the navigation device, and the navigation device using the received modified attribute data in recalculating at least a remainder of the route to the destination. In these embodiments the navigation device preferably initially determines a route to the destination using the attribute data associated with navigable segments of the network of navigable segments according to the digital map data of the device, and recalculates the route using the received modified attribute data.

The server may transmit data indicative of the route determined by the server with the modified attribute data. The data indicative of the route may be data for the complete route or may comprise data indicating the route by comparison to a route to the destination as determined by the navigation device. The method may comprise the navigation device recalculating the route using the received modified attribute data only when it is determined that the route determined by the device has deviated from the route determined by the server.

In some embodiments the method comprises a navigation device determining a route to a destination, and submitting a request to the server to independently determine a route to the destination. The method may comprise the server then determining the route to the destination, and determining modified attribute data in respect of one or more navigable segments forming a recommended navigable stretch that corresponds to at least a part of the determined route. It will be appreciated that the navigation device and the server will both independently determine a route to the destination in hybrid navigation systems. The route may be from the same or different origins. In preferred embodiments the origin is the current position of the navigation device. Where the navigation device has commenced travel along the route to the destination as determined by the navigation device by the time that the server determines the route, the origin of the route determined by the navigation device and the server may therefore differ. Similarly, any recalculation of the route by a navigation device may use a different origin if travel along the route has commenced. In these embodiments, the modified attribute data received from the server will tend to "pull" the route determined by the navigation device toward the recommended navigable stretch. The navigation device may re-calculate the route to the destination upon receipt of the modified attribute data from the server, or may do so if it is determined that the route deviates from that determined by the server.

Another application of the invention is in the context of "convoy driving". In some embodiments the recommended navigable stretch is at least a portion of a path being followed by a lead vehicle of a group of two or more vehicles wishing to travel in a convoy. The stretch is at least a latest portion of the path travelled by the lead vehicle. The method may comprise the server then transmitting modified attribute data in respect of the or each segment of the recommended navigable stretch to a navigation device associated with one or more following vehicles. The method may comprise the server repeating the steps for each subsequent pair of a lead and following vehicle in the group of vehicles wishing to travel in a convoy. A following vehicle for a first pair of vehicles in the group will become the lead vehicle for the next pair of vehicles and so on. In this way, the vehicles in the group may generally follow one another, even where a lead vehicle takes a detour from the route currently being travelled by the following vehicle.

The method may comprise the server using data indicative of the position of the or each navigation device associated with a vehicle of the group of vehicles to determine the path being followed by the vehicle. The server may determine the path in real-time. For example, a user of a navigation device may initiate a "convoy driving mode", which will result in the path taken by the navigation device and hence vehicle being transmitted to the server for use in determining modified attribute data for the segment or segments of a recommended navigable stretch that corresponds to the path.

Of course, many other applications may be envisaged. For example, a service provider may submit a recommended route to the server that includes one of their retail outlets.

The or each navigation device of the system in accordance with any of its embodiments may be of any suitable type. A navigation device may be a PND or an integrated, e.g. in-vehicle, device. The device may be associated with a vehicle, i.e. such that the location of the navigation device corresponds to that of the vehicle. In accordance with any of the aspects or embodiments of the invention the navigation device may comprise a display for displaying an electronic map to a user, a set of one or more processors configured to access digital map data and cause an electronic map to be displayed to a user via the display, and a user interface operable by a user to enable the user to interact with the device. The navigation device is a mobile navigation device. The or a navigation device may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. The navigation device may preferably include global navigation satellite systems (GNSS), such as GPS (Global Positioning System), signal reception and processing functionality. The device may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus. The plurality of navigation devices of the system may be of the same or different types.

As will be appreciated by those skilled in the art, the further aspects of the present invention can and preferably do include any one or more or all of the preferred and optional features of the invention described herein in respect of any of the other aspects of the invention, as appropriate.

It should be noted that the phrase "associated therewith" in relation to one or more segments should not be interpreted to require any particular restriction on data storage locations. The phrase only requires that the features are identifiably related to a segment. Therefore association may for example be achieved by means of a reference to a side file, potentially located in a remote server.

The term "segment" as used herein takes on its usual meaning in the art. A segment may be a navigable link that connects two nodes, or any portion thereof. While embodiments of the present invention are described with reference to road segments, it should be realised that the invention may also be applicable to other navigable segments, such as segments of a path, river, canal, cycle path, tow path, railway line, or the like. For ease of reference these are commonly referred to as a road segment, but any reference to a "road segment" may be replaced by a reference to a "navigable segment" or any specific type or types of such segments. In embodiments, the navigable segments are road segments of a road network, each being associated with data indicative of one or more attributes of the road segments.

It will be appreciated that attribute data need not be associated with each segment in the area of the digital map, although this is preferably the case, provided that attribute data is associated with at least some of the segments, i.e. the plurality of segments referred to herein.

In preferred embodiments the method further comprises providing information indicative of a route determined by a navigation device using the modified attribute data to a user. This may involve outputting the route or information indicative thereof to a user. The information may be in any way indicative of the route, e.g. a set of instructions (which may be audible or visual), but preferably is a visual representation of the route. In preferred embodiments the method comprises displaying the route(s) to a user. However other forms of output may be used. For example the method may alternatively or additionally comprise printing information indicative of the at least one route. Preferably the information indicative of the route is output to a user via a navigation device, but in other embodiments the information may be output by any suitable processing device, e.g. by being displayed by a computer apparatus having route determining capability, but not necessarily navigation capability, etc. This may be relevant where the route is determined by a server. In preferred embodiments, regardless of whether a route is determined by a navigation device such as a PND or integrated, e.g. in-vehicle, navigation device, the information indicative of the route(s) is output to the user by such a device. In preferred embodiments, wherever the route(s) are determined, a step of displaying the route(s) may comprise superposing the or each route on the electronic map.

Although the present invention has been described primarily in embodiments in which a server is in bi-directional communication with one or more navigation devices, and individually transmits data indicative of determined modified attribute data to at least one of the navigation devices, it will be appreciated that at least some of the described applications can also be implemented by a system in which the data indicative of determined modified attribute data is broadcast, e.g. using the radio frequency, from a broadcasting facility for receipt by a plurality of navigation devices.

Any of the methods in accordance with the present invention may be implemented at least partially using software, e.g. computer programs. The present invention thus also extends to a computer program comprising computer readable instructions executable to perform, or to cause a navigation device and/or server to perform, a method according to any of the aspects or embodiments of the invention.

The invention correspondingly extends to a computer software carrier comprising such software which when used to operate a system or apparatus comprising data processing means causes in conjunction with said data processing means said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

In other embodiments, the navigation device may be implemented at least in part by means of an application of a processing device which does not form part of a specific navigation device. For example the invention may be implemented using a suitable computer system arranged to execute navigation software. The system may be a mobile or portable computer system, e.g. a mobile telephone, tablet computer or laptop.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE DRAWINGS

Embodiments of the invention will now be described, by way of example only, with reference to the accompanying Figures, in which.

DETAILED DESCRIPTION OF THE FIGURES

Embodiments of the present invention will now be described with particular reference to a Portable Navigation Device (PND). It should be remembered, however, that the teachings of the present invention are not limited to PNDs but are instead universally applicable to any type of processing device that is configured to execute navigation software in a portable manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

Further, embodiments of the present invention are described with reference to road segments. It should be realised that the invention may also be applicable to other navigable segments, such as segments of a path, river, canal, cycle path, tow path, railway line, or the like. For ease of reference these are commonly referred to as a road segment.

It will also be apparent from the following that the teachings of the present invention even have utility in circumstances, where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
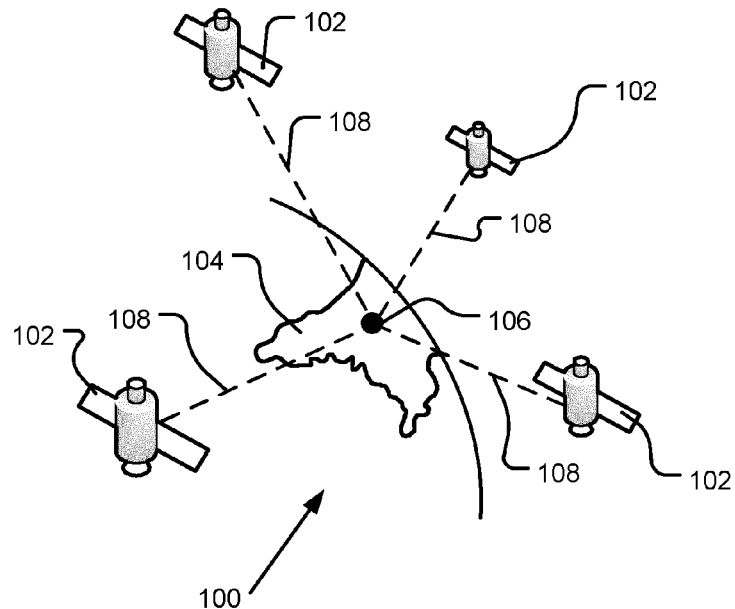
FIG. 1 is a schematic illustration of an exemplary part of a Global Positioning System (GPS) usable by a navigation device.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
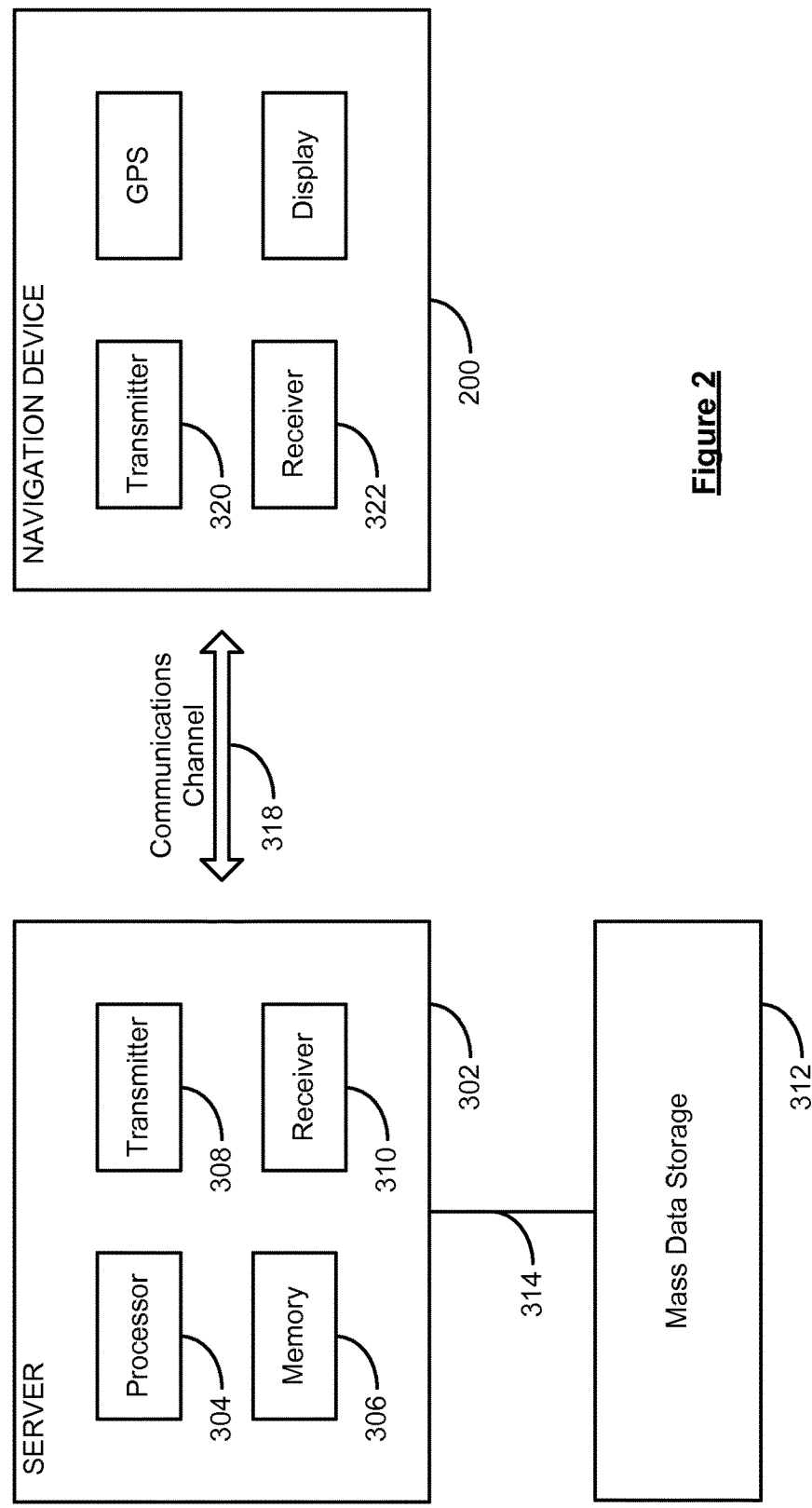
FIG. 2 is a schematic diagram of a communications system for communication between a navigation device and a server.

Turning to FIG. 2, a navigation device 200 (i.e. a PND) comprising or coupled to the GPS receiver device 106, is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11 a/b/c/g/n, etc.

Hence, it can be seen that the Internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc, model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the Internet, etc).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), General Packet Radio Service (GPRS), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2. Of course, the navigation device 200 comprises other hardware and/or functional parts, which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an Internet connection between the server 150 and the navigation device 200.

The navigation device 200 may be provided with information from the server 150 via information downloads which may be updated automatically, from time to time, or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
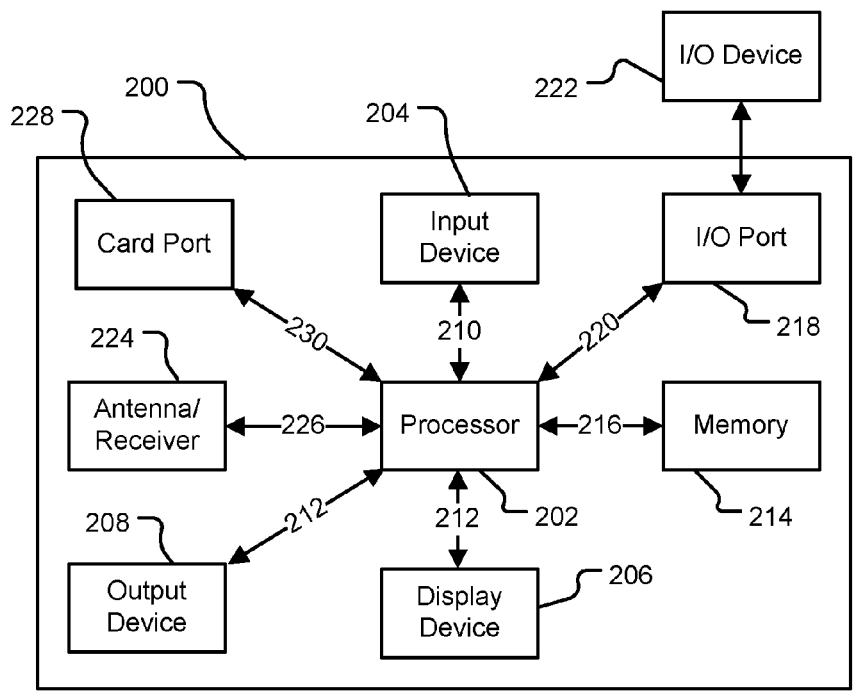
FIG. 3 is a schematic illustration of electronic components of the navigation device of FIG. 2 or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks, xD memory cards, USB (Universal Serial Bus) Flash drives, MMC (MultiMedia) cards, SmartMedia cards, Microdrives, or the like).

FIG. 3 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. Such power sources may include an internal battery and/or a input for a low voltage DC supply or any other suitable arrangement. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Figure 4:
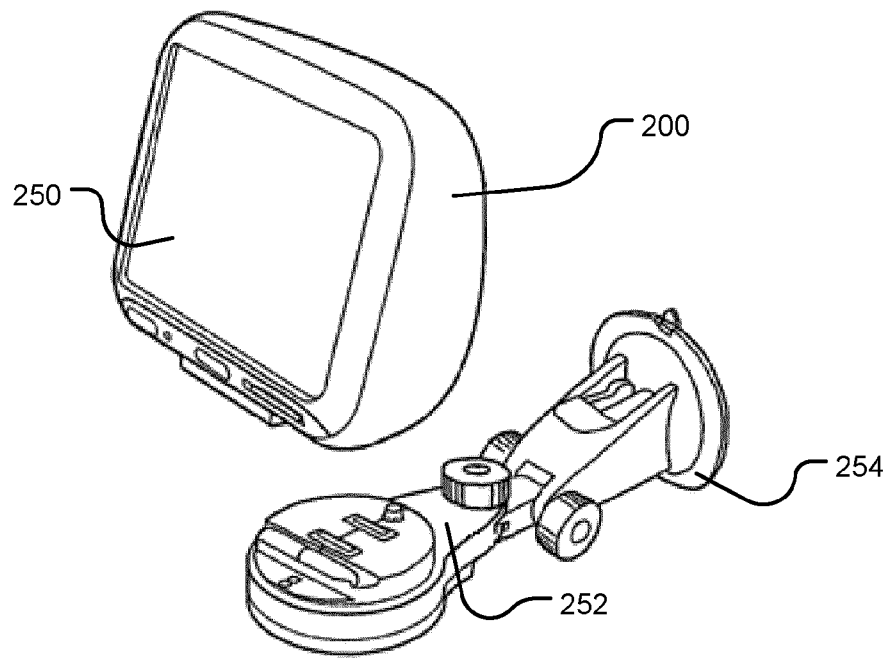
FIG. 4 is a schematic diagram of an arrangement of mounting and/or docking a navigation device.

Referring to FIG. 4, the navigation device 200 may be a unit that includes the integrated input and display device 206 and the other components of FIG. 2 (including, but not limited to, the internal GPS receiver 224, the processor 202, a power supply (not shown), memory systems 214, etc.).

The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

In the embodiment being described, the processor 202 of the navigation device is programmed to receive GPS data received by the antenna 224 and, from time to time, to store that GPS data, together with a time stamp of when the GPS data was received, within the memory 214 to build up a record of the location of the navigation device. Each data record so-stored may be thought of as a GPS fix; i.e. it is a fix of the location of the navigation device and comprises a latitude, a longitude, a time stamp and an accuracy report.

In one embodiment the data is stored substantially on a periodic basis which is for example every 5 seconds. The skilled person will appreciate that other periods would be possible and that there is a balance between data resolution and memory capacity; i.e. as the resolution of the data is increased by taking more samples, more memory is required to hold the data. However, in other embodiments, the resolution might be substantially every: 1 second, 10 seconds, 15 seconds, 20 seconds, 30 seconds, 45 seconds, 1 minute, 2.5 minutes (or indeed, any period in between these periods). Thus, within the memory of the device there is built up a record of the whereabouts of the device 200 at points in time.

In some embodiments, it may be found that the quality of the captured data reduces as the period increases and whilst the degree of degradation will at least in part be dependent upon the speed at which the navigation device 200 was moving a period of roughly 15 seconds may provide a suitable upper limit.

Whilst the navigation device 200 is generally arranged to build up a record of its whereabouts, some embodiments, do not record data for a predetermined period and/or distance at the start or end of a journey. Such an arrangement helps to protect the privacy of the user of the navigation device 200 since it is likely to protect the location of his/her home and other frequented destinations. For example, the navigation device 200 may be arranged not to store data for roughly the first 5 minutes of a journey and/or for roughly the first mile of a journey.

In other embodiments, the GPS may not be stored on a periodic basis but may be stored within the memory when a predetermined event occurs. For example, the processor 202 may be programmed to store the GPS data when the device passes a road junction, a change of road segment, or other such event.

Further, the processor 202 is arranged, from time to time, to upload the record of the whereabouts of the device 200 (i.e. the GPS data and the time stamp) to the server 150. In some embodiments in which the navigation device 200 has a permanent, or at least generally present, communication channel 152 connecting it to the server 150 the uploading of the data occurs on a periodic basis which may for example be once every 24 hours. The skilled person will appreciate that other periods are possible and may be substantially any of the following periods: 15 minutes, 30 minutes, hourly, every 2 hours, every 5 hours, every 12 hours, every 2 days, weekly, or any time in between these. Indeed, in such embodiments the processor 202 may be arranged to upload the record of the whereabouts on a substantially real time basis, although this may inevitably mean that data is in fact transmitted from time to time with a relatively short period between the transmissions and as such may be more correctly thought of as being pseudo real time. In such pseudo real time embodiments, the navigation device may be arranged to buffer the GPS fixes within the memory 214 and/or on a card inserted in the port 228 and to transmit these when a predetermined number have been stored. This predetermined number may be on the order of 20, 36, 100, 200 or any number in between. The skilled person will appreciate that the predetermined number is in part governed by the size of the memory 214 or card within the port 228.

In other embodiments, which do not have a generally present communication channel 152 the processor 202 may be arranged to upload the record to the server 152 when a communication channel 152 is created. This may for example, be when the navigation device 200 is connected to a user's computer. Again, in such embodiments, the navigation device may be arranged to buffer the GPS fixes within the memory 214 or on a card inserted in the port 228. Should the memory 214 or card inserted in the port 228 become full of GPS fixes the navigation device may be arranged to deleted the oldest GPS fixes and as such it may be thought of as a First in First Out (FIFO) buffer.

In the embodiment being described, the record of the whereabouts comprises one or more traces with each trace representing the movement of that navigation device 200 within a 24 hour period. Each 24 is arranged to coincide with a calendar day but in other embodiments, this need not be the case.

Generally, a user of a navigation device 200 gives his/her consent for the record of the devices whereabouts to be uploaded to the server 150. If no consent is given then no record is uploaded to the server 150. The navigation device itself, and/or a computer to which the navigation device is connected may be arranged to ask the user for his/her consent to such use of the record of whereabouts.

The server 150 is arranged to receive the record of the whereabouts of the device and to store this within the mass data storage 160 for processing. Thus, as time passes the mass data storage 160 accumulates a plurality of records of the whereabouts of navigation devices 200 which have uploaded data.

As discussed above, the mass data storage 160 also contains map data. Such map data provides information about the location of road segments, points of interest and other such information that is generally found on map.

Some preferred embodiments of the invention will now be described by reference to FIGS. 5-8.

Figure 5:
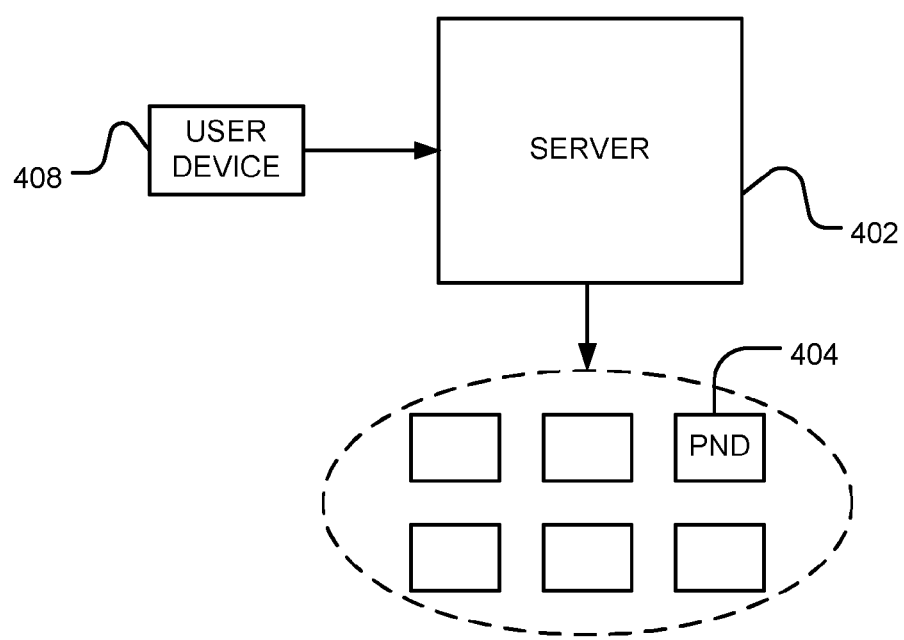
FIG. 5 is a schematic illustration of a system that may be used to implement methods of the present invention.

FIG. 5 illustrates an exemplary system which may be used in the implementation of methods in accordance with certain preferred embodiments of the invention.

The system 400 includes a server 402 and a plurality of mobile devices; in this case portable navigation devices (PNDs) 404. The server 402 is in bi-directional communication with each of the PNDs 404 associated with vehicles. Of course, rather than PNDs, some or all of the navigation devices may be in the form of integrated in-vehicle navigation devices. Each of the PNDs is arranged to periodically transmit the current location of the PND and hence vehicle to the server 402. Thus the server has knowledge of the current location of each PND at any given time.

The server 402 stores digital map data representing a plurality of road segments of a road network in an area covered by the digital map. Attribute data is associated with the data indicative of each road segment as known in the art. For example, attribute data may be indicative of a length of a segment, curvature of the segment, gradient, fuel consumption for traversing the segment, expected time to traverse the segment for a given time period, etc. Each segment may be associated with data indicative of one or more attribute. Preferred embodiments of the invention will be described by reference to the case in which at least flow speed data is associated with each segment. The flow speed data is indicative of the expected speed for traversing the segment in a given time period. The flow speed data is based upon historical flow speed data for the segment, and is indicative of the historical average flow speed for traversing the segment in the given time period. In certain embodiments, each road segment is associated with flow speed data for each of a plurality of different time periods, e.g. at 5 minute, intervals for each day of the week. In this way, relevant expected flow speed data for any given time period may be determined. In such cases, the flow speed data may be referred to as speed profile data for the segment. The flow speed data may be based at least in part upon vehicle probe data as known in the art, and/or data determined from other sources, e.g. fixed sensors, etc.

Each PND 404 also stores digital map data representing the plurality of road segments of the road network with the associated attribute data for the segments. The digital map data stored by each PND 404 may be the same as the digital map data stored at the server 402, or it may be a subset thereof.

Figure 6:
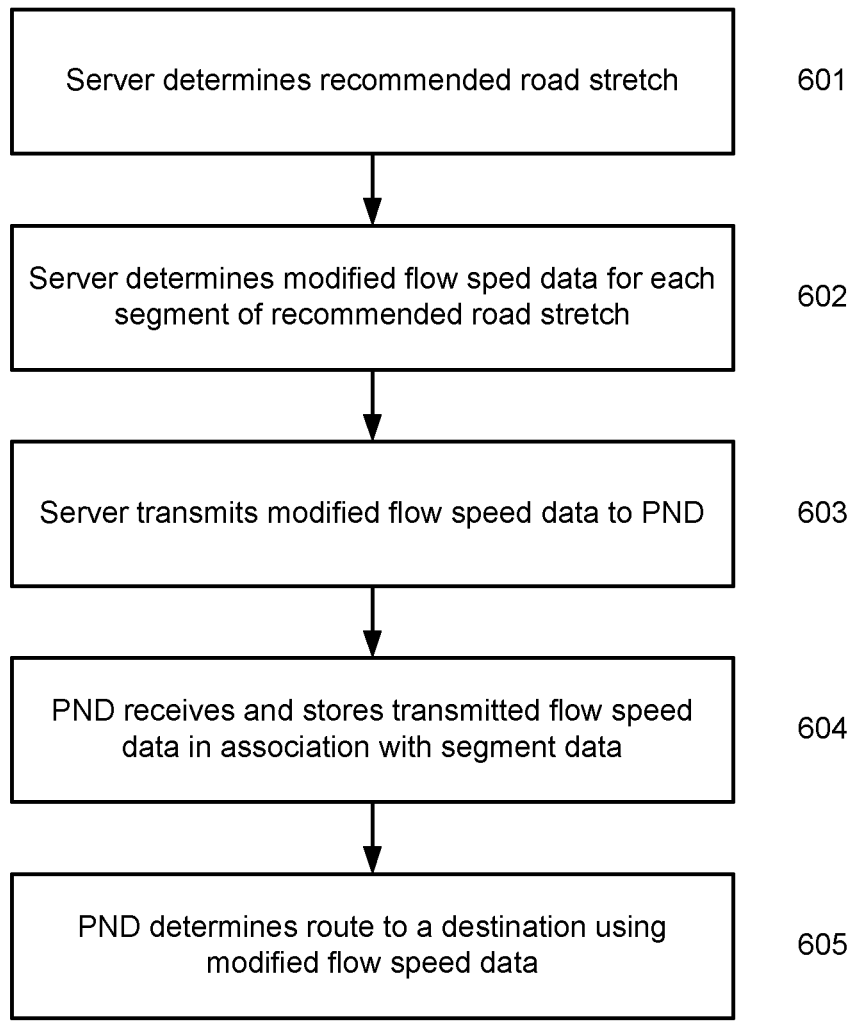
FIG. 6 is a flow chart illustrating the steps of a method in accordance with one embodiment of the invention.

A method in accordance with one preferred embodiment of the invention will now be described by reference to FIG. 6.

In step 601, the server 402 determines a road stretch, being one or more consecutive road segments, that is to be recommended to a set of one or more of the PNDs 404. The recommended road stretch may be selected by the server or the server may receive data indicative of the recommended road stretch in accordance with different applications of the invention described below.

In step 602, the server 402 determines modified flow speed data for each of the segments forming part of the recommended road stretch. The modified flow speed data is determined such that it will result in the road segment being treated more favourably when a routing engine determines a route to a destination through the network of road segments by reference to the flow speed attribute data associated with the road segments. In other words, the modified flow speed data will make the segment more favourable for inclusion in a route. The flow speed is selected as the attribute to be modified as it is generally taken into account by a PND 404 when determining a route to a destination through a road network. For example, the PND 404 may be arranged to determine a least cost path based upon a cost associated with each road segment that is based at least on the flow speed for the segment.

Of course other attributes may alternatively or additionally be modified provided that they result in the road segment of the recommended stretch being treated more favourably by a routing engine. The appropriate choice of attribute or attributes to be modified will therefore depend upon the settings of a routing engine of a device to which the road stretch is to be communicated. It is envisaged that the server 402 may first determine the settings of a routing engine for the or each navigation device to which the recommended road stretch is desired to be transmitted in order to select the appropriate attribute for modification, or may otherwise have access to such settings. Examples of other attributes that may be modified include a traversal time for a segment, fuel consumption for the segment, curvature of a segment, length of the segment, etc.

Returning to the example in which the server modifies the flow speed of each segment of the recommended road stretch, the server determines modified flow speed data for the segment that is an arbitrarily high flow speed such as 200 km/hr. This is because a routing engine will generally favour segments having a higher flow speed as this may allow a "fastest route" to a destination to be determined. The routing engine may determine a least cost path based upon a cost that has an inverse relationship to the flow speed. Higher flow speeds would be associated with lower costs for segments such that the least cost path would be a fastest path.

The server 402, in step 603, transmits the modified flow speed data in association with data indicative of the or each road segment to which it relates to a subset of the PNDs 404, which are selected depending upon the application of the method. Some examples are discussed below. The selection of the PNDs may be based at least on a current position of the PNDs which is known to the server. This may be used to identify those PNDs to which the recommended route is likely to be of relevance, i.e. those in proximity thereto.

In step 604, each PND 404 of the subset of PNDs receives the transmitted flow speed data and stores the data in association with the relevant road segment data in the digital map data of the device, to replace the existing flow speed data associated with the segments, or in addition thereto. It is envisaged that the modified flow speed data may only be temporarily retained and/or may be retained in addition to the existing flow speed data for a segment to enable the existing (or unmodified) flow speed data of the device to be used at a future time once the road stretch recommendation is no longer applicable, or for purposes other than route determination.

In step 605 each PND 404 of the subset of PNDs determines a route to a destination using at least the flow speed data associated with the road segments of its digital map data, including (where appropriate) the modified flow speed data received from the server. The route may be a new route, or a recalculation of a remainder of a route already being travelled. The routing engine of the PND 404 determines the route using a cost function that determines a least cost route across the road network. The cost for a road segment is related to the attribute(s) of the segment such that a reduced cost is associated with a segment that is associated with a higher flow speed. In this way, the route determination will tend to incorporate the recommended road stretch, as its segments are associated with a high flow speed, or, where an existing route is being travelled, the remainder of the route will tend to gravitate toward the recommended stretch.

In some preferred embodiments, the modified flow speed data may be transmitted by the server 402 to the or each PND 404 of the subset of devices in a similar manner to that in which modified flow speed data may be communicated by a traffic server, e.g. as envisaged in WO 2009/053406 A1. The modified flow data may be transmitted in a similar manner to a prior art traffic message. It is known to transmit data indicative of an updated flow speed for a road segment to a PND where the actual flow speed along the segment is lower than expected, e.g. due to congestion. This may be achieved using a suitable traffic message. In this situation a traffic server may transmit an updated actual flow speed for a segment affected by traffic to PNDs so that the PNDs may use this updated flow speed when determining a route, such that the route may be more likely to avoid those affected segments. The present invention may be implemented using similar infrastructure, except that the server will additionally or alternatively transmit data indicative of a higher flow speed for a segment to cause it to be favoured in route determination. Of course, the methods of the present invention may be implemented in conjunction with prior art techniques in which the server also transmits modified flow speed data indicative of lower flow speeds for road segments other than those of the recommended stretch that are affected by congestion.

The received modified flow speed data is used by a PND 404 at least in route determination. However, in preferred embodiments, the existing flow speed data for the segment, which is indicative of the expected flow speed, is used at the same time for other purposes, e.g. to determine an estimated time of arrival for travel along a route including a segment or segments of the recommended stretch. This is because the modified flow speed is not indicative of an actual flow speed for the segment, and would not give rise to an accurate ETA. Thus, the existing flow speed data should be used for determining attributes of the route or similar data where it is important to use the accurate flow speed values.

In one preferred application of the invention, the server 402 is a server at a traffic management centre. The server 402 may be arranged to obtain real-time traffic information from one or more sources, and/or may be able to generate such data itself. For example, the server may receive traffic information from third party providers, e.g. via traffic messages, or may be arranged to determine real-time traffic information by reference to vehicle probe data, e.g. GPS or GSM probe data, sensors along the road network, journalistic data, etc. The server may be arranged to identify a traffic event, whether by itself, or by receiving data indicative of such an event from another source. A traffic event may be identified by comparison of actual flow speeds along road segments of the network to the expected values for the relevant time of day and day of the week. Where the actual flow speed is below a historic flow speed for the segment by more than a given threshold, a traffic message may be generated by the server indicative of the actual flow speed for the road segment. Alternatively the server may generate such a traffic message based upon traffic data received from another source.

The server may then transmit the traffic messages including the actual, i.e. recently determined, flow speed for traffic affected road segments to one or more PNDs. The PNDs may be those PNDs for which a first predetermined area, e.g. circle or square, around the current position of the PND includes the affected segments. In some embodiments all traffic messages for a first predetermined area around the current position of a PND, i.e. vehicle are transmitted to PNDs associated with vehicles, but only those traffic messages having a high level of importance, e.g. based upon severity of delay, severity of incident, distance to incident, etc) for a second larger predetermined area, e.g. circle or square, around the current position of the PND are transmitted to the PNDs. The traffic messages may additionally include data such as a jam tendency parameter, e.g. whether the jam is growing or shrinking, and/or a predicted expiration time.

In accordance with embodiments of the invention, the traffic server determines one or more road segments that are affected by traffic, and determines a recommended road stretch that will provide at least a part of an alternative route around the affected segment(s). The traffic server then determines modified flow speed data for each segment of the recommended stretch as described earlier, and transmits the data to a set of one or more PNDs having a current position in proximity to the segment(s) that are affected by traffic. For example, the PNDs may be those PNDs having a current position in a first or second area which results in the PND receiving traffic messages in respect of the affected segments as described above. The modified flow speed data for the purposes of the present invention may be transmitted in a similar manner as a traffic message, this time with the flow speed being arbitrarily high, rather than being an actual, reduced flow speed. In other arrangements, the traffic server may select the recommended road stretch to balance load among the road segments of the network to try to avoid congestion in the network, rather than to provide a route that avoids traffic affected segments.

The steps of the method illustrated in FIG. 6 will now be described with reference to the exemplary screens displayed on a navigation device shown in FIGS. 7A-C.

Figure 7A:
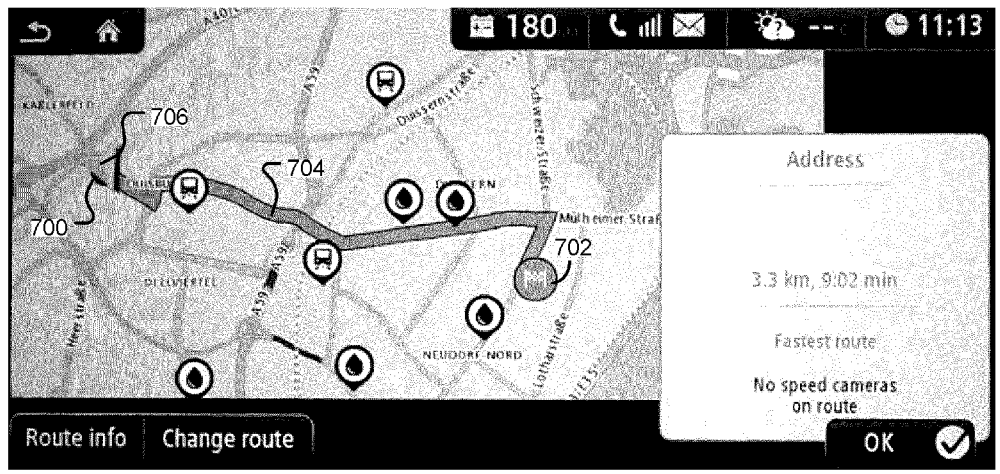
FIGS. 7A-C show exemplary screens displayed on a navigation device illustrating the steps of the method of FIG. 6.
Figure 7B:
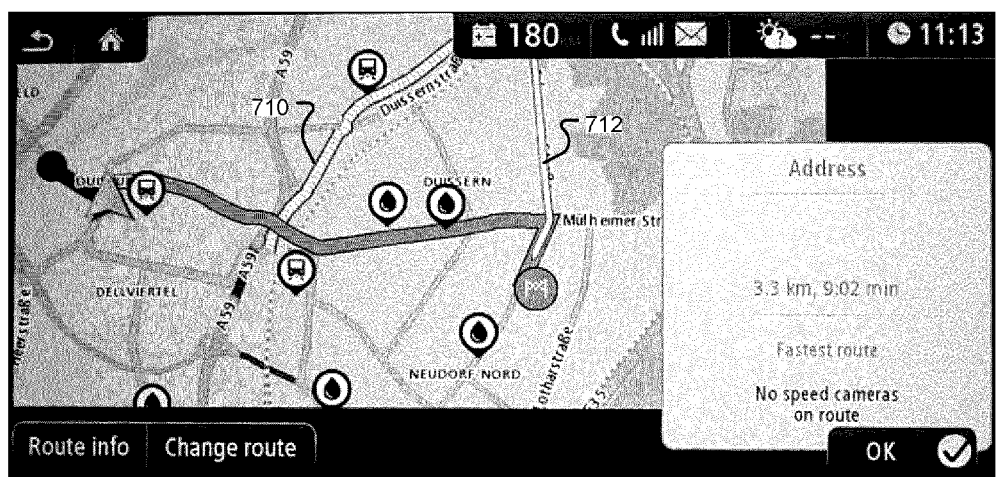

FIG. 7A shows a route 704 which has been calculated by a routing engine between an origin location 700 and a destination location 702; the route 704 being the fastest route between the two locations and having a distance of 3.3 km and an estimated journey time of just over 9 minutes. The current position of the device along the calculated route 704 is shown by the icon 706.

During travel along the calculated route 704, the device receives a recommended road stretch from a server. As shown in FIG. 7B, the recommended road stretch comprises segments 710 and 712, which are assigned an increased flow speed (that is significantly higher than the expected or even permitted speed of travel along the segment).

Figure 7C:
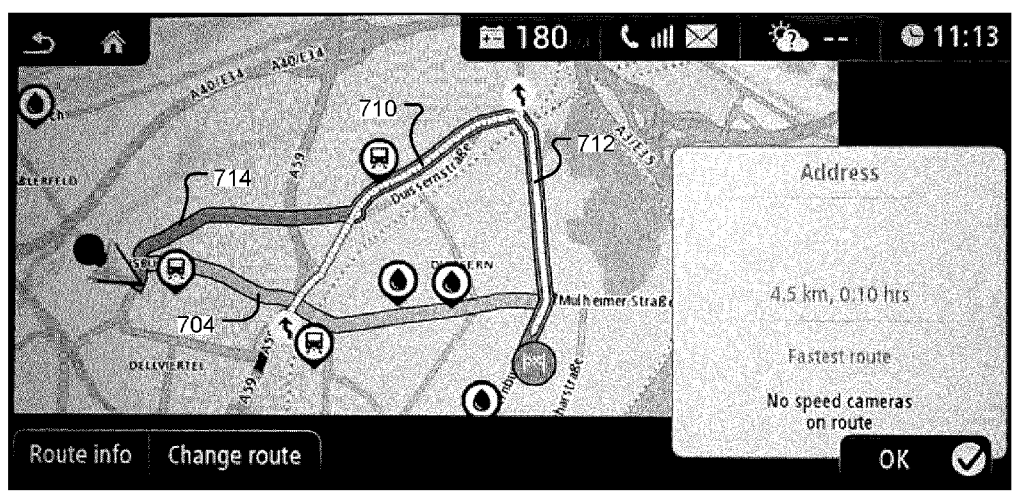

Upon an automatic, or user requested, recalculation of the "fastest" route from the current position of the device 706 to the destination location 702, and as shown in FIG. 7C, the route 714 is now determined to include the segments 710 and 712. The route 714 is determined by the routing engine to be the fastest route due to the increased flow speed assigned to segments 710 and 712; although it will be seen that the route 714 has a longer distance of 4.5 km and a larger estimated journey time of 10 minutes.

In order to illustrate certain exemplary applications of the methods of the invention, the server 402 in FIG. 5 is illustrated as being in communication with a user device 408 in order to illustrate certain preferred embodiments of the invention. This is optional. The user device 408 may be any suitable device that is able to communicate with the server via an internet connection, e.g. a mobile device, laptop or other computing device.

In some applications, the server 402 may receive an indication of the recommended road stretch from the user device 408, e.g. via a social media website. The road stretch is a road stretch that a user wishes to recommend to one or more other users. The server 402 may then modify the attribute data in respect of each segment of the recommended road stretch as discussed above, and transmit it to a set of one or more PNDs. The PNDs in this case will be PNDs of users that have opted to receive recommendations from other users in general, or from specific users. The server will have access to data indicative of the identities of different PNDs that have opted to receive such data. The road stretch might be a stretch that a user considers to be particularly scenic or fun to drive, for example.

In other exemplary applications, the invention may be used to facilitate convoy travel by a group of two or more vehicles. The group of two or more vehicles may be seen as including a lead vehicle and one or more following vehicles. Alternatively, the group of two or more vehicles may be seen as including one or more pairs of a lead and following vehicle. In such latter embodiments, the following vehicle for one pair would be the lead vehicle for the next, and so on. The PND associated with at least the lead vehicle, and preferably each vehicle, of the group of vehicles will transmit data indicative of its current position to the server periodically, such that the server has knowledge of the route followed by each vehicle in real time. The server will use at least the latest portion of the route followed by a lead vehicle as a recommended road stretch for which to determine modified attribute data, e.g. flow speed data. The server transmits data indicative of the modified attribute data to the PND associated with the or each following vehicle. In this way, the route followed by the or each following vehicle may be caused to conform to the route of a lead vehicle.

Figure 8A:
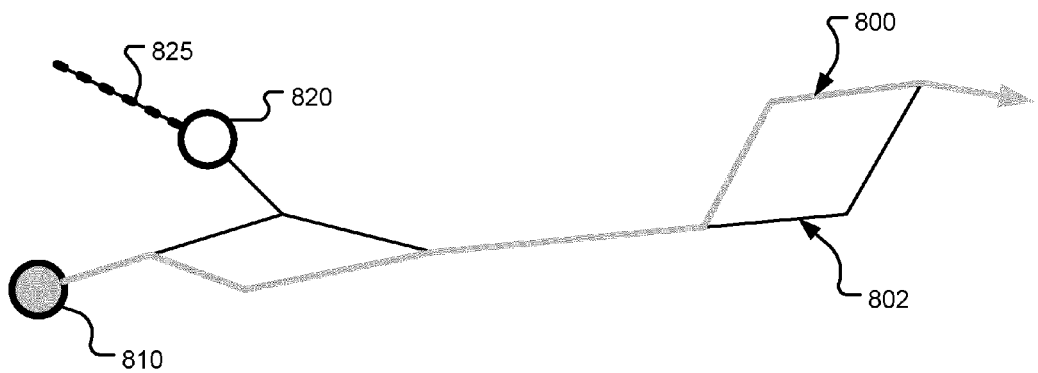
FIGS. 8A-C are illustrations of the way in which the path of a following driver may be caused to conform to the path of a lead vehicle when the methods of the present invention are employed in a convoy driving application.
Figure 8B:
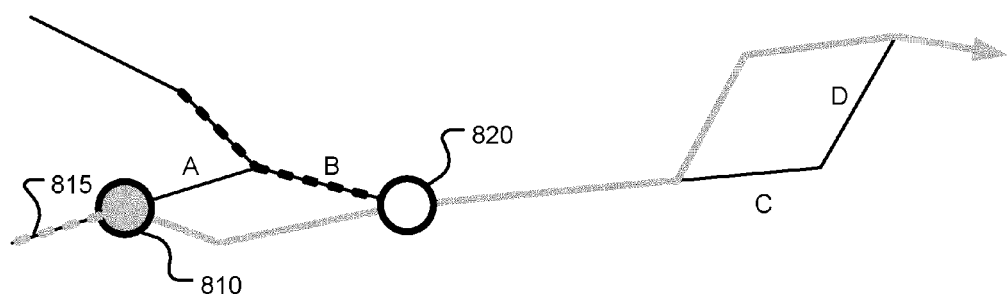
Figure 8C:
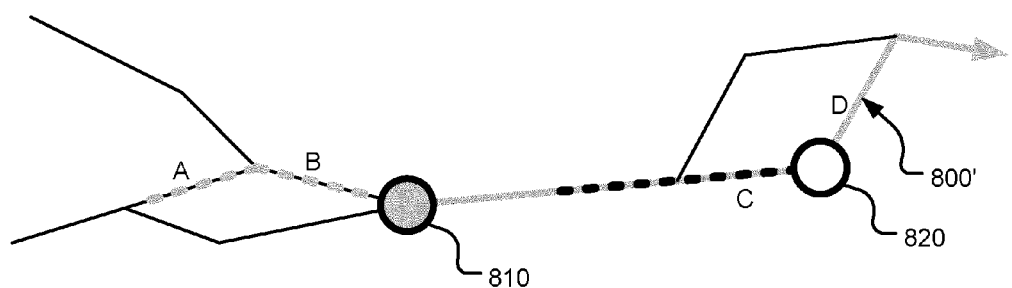

FIGS. 8A-C illustrate the way in which transmission of modified flow speed data for one or more segments of a recommended road stretch corresponding to a route travelled by a lead vehicle can be used by the PND of a following vehicle to align to the route of the lead vehicle. It has been found that by transmitting the recommended route by means of modified flow speed data in accordance with the invention, a following driver may travel a route that will continue to generally align with the lead vehicle even if the lead vehicle makes small detours from a route previously calculated by the following vehicle.

In FIG. 8A, the location of two vehicles 810 and 820 are shown on a road network depicted by segments 802. The lead vehicle is shown as 820, and has a recommended route stretch 825 associated therewith. The following vehicle is shown as 810, and is travelling along a previously calculated route 800.

In FIG. 8B, which shows a later time than that shown in FIG. 8A, the lead vehicle 820 is depicted as having joined the calculate route of the following vehicle 810 by way of segment B. The following vehicle 810 also has a recommended route stretch 815 associated therewith; which may be used by a third vehicle travelling behind the following vehicle 810 on the road network 802.

Finally, in FIG. 8C, the lead vehicle 820 is seen as having travelled a different route from that depicted by 800 (although eventually reaching the same point on the road network) by traversing segments C and D. Due to this, and also due to the traversal of the lead vehicle 820 along segment B, the route of the following vehicle has been recalculated, and now shown as 800', so as to cause the following vehicle 810 to traverse segments A and B, and to follow the lead vehicle 820 along segments C and D.

In summary, in a system as depicted in FIGS. 8A-8C, each vehicle of a group of vehicles that wish to travel together, trail a short, e.g. 500 m, recommended road stretch behind them; the recommended road stretch being indicative of the path the vehicle has just travelled on the road network. This recommended road stretch is transmitted to one or more of the other vehicles in the group, e.g. the vehicle of the group immediately behind the vehicle that generated the recommended road stretch, such that the determined route to be followed by these other vehicles tends to align with the recommended road stretch.

In yet another exemplary application, the present invention may be used in the context of hybrid navigation. In this embodiment a PND 404 determines a route to a destination using its digital map data, by reference to the attribute data thereof, including the flow speed data for the segments. The vehicle associated with the PND can then immediately start to travel along this PND generated route. The PND also submits a request to the server 402 to independently generate a route from the current position of the PND to the destination. The server 402 carries out this route determination based on the attribute data of its own digital map data. This may be more up to date than that of the PND, taking into account real-time traffic data, etc. The server 402 may then use the determined route as the recommended road stretch in relation to which to derive modified flow speed data. The server then transmits the modified flow speed data to the PND, which then recalculates a remainder of the route to the destination yet to be travelled using the received modified flow speed data. In this way, the route used by the PND may be caused to more closely conform to the recommended route determined by the server. The server may only transmit the modified flow speed data to the PND in order to cause the route followed by the PND to more closely conform to the route determined by the server if the PND has deviated from the route as determined by the server. The PND may only recalculate the route upon receipt of such data from the server, such that recalculation only occurs in the event of a deviation from the server determined route.

Thus, when methods of the invention are used for hybrid routing purposes, the recommended road stretch provided by the server may be used to "pull" the route determined by the PND (the "on-board" route) back to the server determined or "off-board" route. This is in contrast to prior art techniques in which the PND may instead, if its own determined route deviates from that determined by a server, simply determine a route that will take the PND back to the server route as soon as possible.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example, the navigation device may utilise other global navigation satellite systems, such as the European Galileo system. Equally, it is not limited to satellite-based systems, but could readily function using ground-based beacons or other kind of system that enables the device to determine its geographic location.

It will also be well understood by persons of ordinary skill in the art that whilst the preferred embodiment may implement certain functionality by means of software, that functionality could equally be implemented solely in hardware (for example by means of one or more SICs (application specific integrated circuit)) or indeed by a mix of hardware and software.

Lastly, it should be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specially enumerated in the accompanying claims at this time.

The invention claimed is:

1. A method of operating a server to provide information indicative of a recommended navigable stretch to a set of one or more navigation devices of a plurality of navigation devices in communication with the server, wherein the server has access to digital map data comprising data representative of a plurality of navigable segments of a navigable network, each navigable segment having attribute data representative of one or more attributes associated therewith, the method comprising the server:
receiving data indicative of a recommended navigable stretch that includes one or more navigable segments from among the plurality of navigable segments;
determining modified attribute data for the or each navigable segment of the recommended navigable stretch, wherein the modified attribute data is determined so as to make the or each navigable segment more favourable when a route is determined through the navigable network using the attribute data associated with the or each navigable segment; and
transmitting data indicative of the modified attribute data for the or each navigable segment of the recommended navigable stretch to the set of one or more of the navigation devices, the data indicative of the modified attribute data being configured to be used by the or each navigation device to make a corresponding modification of the attribute data for the or each navigable segment, so that a value of the attribute data for the or each navigable segment is changed by a respective receiving navigation device before determining, using navigation device position information acquired from a position sensing system of the navigation device, a route through the navigable network using the attribute data for the or each navigable segment.

2. The method of claim 1, further comprising the or each navigation device of the set of one or more navigation devices to which the data indicative of the modified attribute data is transmitted using the data indicative of modified attribute data in determining a route through the navigable network to a destination.

3. The method of claim 2, further comprising the or each navigation device to which the data indicative of the modified attribute data is transmitted using existing attribute data, and not the data indicative of modified attribute data, for performing one or more operations other than determining a route through the navigable network to the destination, the one or more operations comprising determining an estimated time of arrival at the destination.

4. The method of claim 1, wherein the or each navigation device comprises a routing engine arranged to determine routes through the navigable network represented by digital map data to destinations based on corresponding costs of traversing the navigable segment associated with each of a plurality of the navigable segments thereof, the cost of traversing a given navigable segment for the purposes of route determination being determined by reference to attribute data for one or more attributes of the given navigable segment, including attribute data that has been modified based on data indicative of the modified attribute data.

5. The method of claim 1, wherein the data indicative of the modified attribute data for the or each navigable segment of the recommended navigable stretch indicates a modification to be made to a flow speed attribute.

6. The method of claim 5, wherein the modification to be made to the flow speed attribute is an increase in flow speed relative to a flow speed indicated by existing flow speed data.

7. The method of claim 5, comprising:
determining one or more other navigable segments of the navigable network along which an actual flow speed is lower than an expected flow speed, wherein the one or more other navigable segments are navigable segments other than the or each navigable segment of the recommended navigable stretch; and
transmitting data indicative of a reduced flow speed for the one or more other navigable segments to the set of one or more of the navigation devices for use by the or each navigation device in making a corresponding reduction of a flow speed attribute for the one or more other navigable segments.

8. The method of claim 1, wherein the recommended navigable stretch is at least a portion of a route to a destination determined by the server in response to a request by a navigation device, and the server transmits the data indicative of the modified attribute data to the navigation device that requested the server to determine the route.

9. The method of claim 8, wherein the method comprises the navigation device initially determining a route to the destination, and submitting a request to the server to independently determine a route to the destination, and wherein the navigation device uses the data indicative of the modified attribute data to recalculate at least a remainder of the route to the destination.

10. The method of claim 1, wherein the recommended navigable stretch is a navigable stretch that provides an alternative route around one or more selected navigable segments to be avoided, wherein the one or more selected navigable segments to be avoided include one or more navigable segments on which traffic flow is effected by congestion or an event, or in order to balance a traffic load.

11. The method of claim 1, wherein the recommended navigable stretch is a navigable stretch that a user wishes to share with other users, and the method comprises the server receiving an indication of the recommended navigable stretch from a user, optionally wherein the server provides data indicative of the modified attribute data for the or each navigable segment of the recommended navigable stretch to a set of one or more navigation devices that are members of a predefined group of navigation devices for receiving information indicative of recommended navigable stretches suggested by other users.

12. The method of claim 1, wherein the recommended navigable stretch is at least a portion of a path being followed by a lead vehicle of a group of two or more vehicles wishing to travel in a convoy, wherein the server transmits the data indicative of the modified attribute data in respect of the or each navigable segment of the recommended navigable stretch to a navigation device associated with one or more following vehicles.

13. The method of claim 1, comprising the server selecting the set of one or more navigation devices to which to transmit the data indicative of the modified attribute data based at least in part upon a current position of the or each navigation device.

14. A server arranged to provide information indicative of a recommended navigable stretch to a set of one or more navigation devices of a plurality of navigation devices in communication with the server, the server having access to digital map data comprising data representative of a plurality of navigable segments of a navigable network, each navigable segment having attribute data representative of one or more attributes associated therewith, the server comprising one or more processors arranged to:
receive data indicative of a recommended navigable stretch that includes one or more navigable segments from among the plurality of navigable segments;
determine modified attribute data for the or each navigable segment of the recommended navigable stretch, wherein the modified attribute data is determined so as to make the or each navigable segment more favourable when a route is determined through the navigable network using the attribute data associated with the or each navigable segment; and
transmit data indicative of the modified attribute data for the or each navigable segment of the recommended navigable stretch to the set of one or more of the navigation devices, the data indicative of the modified attribute data being configured to be used by the or each navigation device to make a corresponding modification of the attribute data for the or each navigable segment, so that a value of the attribute data for the or each navigable segment is changed by a respective receiving navigation device before determining, using navigation device position information acquired from a position sensing system of the navigation device, a route through the navigable network using the attribute data for the or each navigable segment.

15. A method of operating a navigation device in communication with a server, the navigation device comprising digital map data including data representative of a plurality of navigable segments of a navigable network, each navigable segment having attribute data representative of one or more attributes associated therewith, and the navigation device being further arranged to be able to determine a route through the navigable network using the attribute data associated with the navigable segments, the method comprising:
receiving, from the server, data indicative of modified attribute data for the or each navigable segment of a recommended navigable stretch, wherein the modified attribute data is determined so as to make the or each navigable segment more favourable when a route is determined through the navigable network using the attribute data associated with the or each navigable segment; and
using the data indicative of the modified attribute data to make a corresponding modification of the attribute data for the or each navigable segment, so that a value of the attribute data for the or each navigable segment is changed before determining, using navigation device position information acquired from a position sensing system of the navigation device, a route through the navigable network using the attribute data for the or each navigable segment, wherein:
the recommended navigable stretch is at least a portion of a route to a destination determined by the server in response to a request by the navigation device;
the recommended navigable stretch is a navigable stretch that provides an alternative route around one or more navigable segments that are to be avoided;
the recommended navigable stretch is a navigable stretch that a user wishes to share with other users, the server having received an indication of the recommended navigable stretch from a user, and wherein the navigation device is a member of a predefined group of navigation devices for receiving information indicative of recommended navigable stretches suggested by other users; or
the recommended navigable stretch is at least a portion of a path being followed by a lead vehicle of a group of two or more vehicles wishing to travel in a convoy, and wherein the navigation device that receives the modified attribute data from the server is associated with one or more following vehicles.

16. A non-transitory computer readable medium comprising computer readable instructions which, when executed by a server, cause the server to perform a method for providing information indicative of a recommended navigable stretch to a set of one or more navigation devices of a plurality of navigation devices in communication with the server, wherein the server has access to digital map data comprising data representative of a plurality of navigable segments of a navigable network, each navigable segment having attribute data representative of one or more attributes associated therewith, the method comprising:
receiving data indicative of a recommended navigable stretch that includes one or more navigable segments from among the plurality of navigable segments;
determining modified attribute data for the or each navigable segment of the recommended navigable stretch, wherein the modified attribute data is determined so as to make the or each navigable segment more favourable when a route is determined through the navigable network using the attribute data associated with the or each navigable segment; and transmitting data indicative of the modified attribute data for the or each navigable segment of the recommended navigable stretch to the set of one or more of the navigation devices, the data indicative of the modified attribute data being configured to be used by the or each navigation device to make a corresponding modification of the attribute data for the or each navigable segment, so that a value of the attribute data for the or each navigable segment is changed by a respective receiving navigation device before determining, using navigation device position information acquired from a position sensing system of the navigation device, a route through the navigable network using the attribute data for the or each navigable segment.

* * * * *